United States Patent Office 3,380,593
Patented Apr. 30, 1968

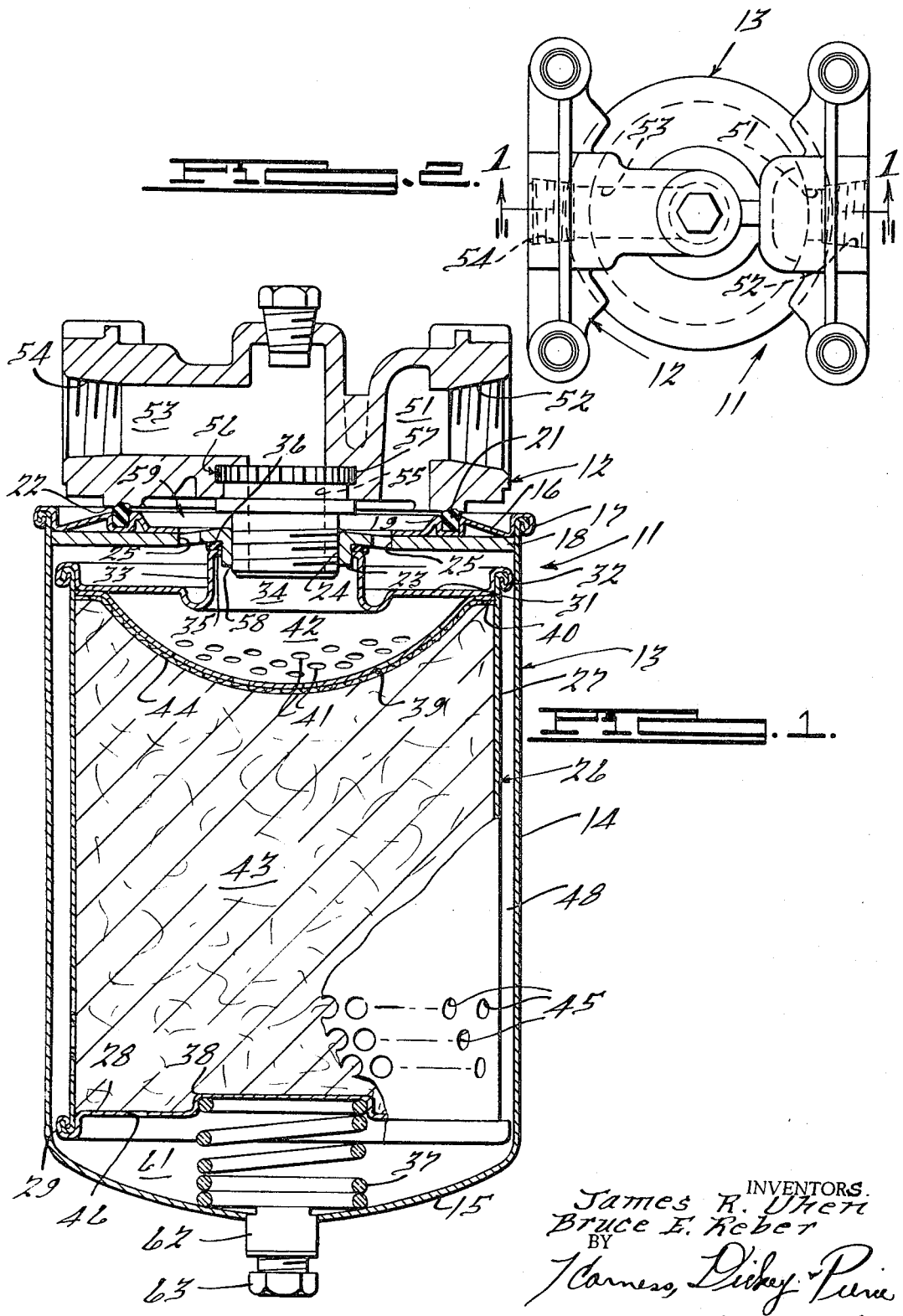

3,380,593
TWIST-ON, AXIAL FLOW FILTER ELEMENT
James R. Uhen, Burlington, and Bruce E. Reber, Racine, Wis., assignors to Walker Manufacturing Company, a corporation of Delaware
Filed Dec. 6, 1965, Ser. No. 511,922
3 Claims. (Cl. 210—356)

ABSTRACT OF THE DISCLOSURE

A throw-away type fluid filter particularly adapted for filtering diesel fuel oil consisting of a housing having fluid inlet and fluid outlet passages in one end wall and a filtering element affixed within the housing and interposed in the path of fluid flow from the inlet to the outlet passage. The filter element is of the axial flow type.

---

This invention relates to a fluid filter and more particularly to an improved type of axial flow filter.

A common type of fluid filter, particularly found in the throw-away type, includes a radial flow element. That is, the filter cartridge is comprised of concentric perforate inner and outer shells between which a filter media is positioned. The fluid flows radially through the media between the inner and outer shells. This type of cartridge is prone to a filtering defect known as "channelling." In channelling the great percentage of the fluid flow passes through low porosity sections of the filter media resulting in a significantly decreased filter efficiency.

It is, therefore, a principal object of this invention to provide an improved filter assembly that is less prone to channelling.

It is a further object of this invention to provide an improved axial flow filter element.

It is another object of the invention to provide an improved axial flow filter cartridge that may be used in a throw-away type filter.

A filter cartridge embodying this invention is comprised of a cylindrical outer shell closed at its opposite ends by first and second end caps to define a filtering chamber. A filtering media substantially fills the filtering chamber and a fluid inlet passage is formed contiguous to one end of the cartridge and a fluid outlet passage is formed contiguous to the other end for axial flow through the filter media.

The aforedescribed filter cartridge may be used in conjunction with a throw-away type filter having an imperforate outer housing closed at one end by an end closure in which fluid inlet and fluid outlet means are formed. The cartridge is contained within the housing with a fluid cavity being formed therebetween which communicates with one of the end closure fluid means and one of the filter cartridge fluid passages. A fluid tight connection is provided between the other end closure fluid means and the other cartridge fluid passage.

Other objects and advantages of this invention will become more apparent as this description proceeds, particularly when considered in conjunction with the accompanying drawings, wherein:

FIGURE 1 is a cross-sectional view of a filter unit emboding this invention and taken generally along the line 1—1 of FIGURE 2; and FIGURE 2 is a top plan view, on a reduced scale, of the filter unit shown in FIGURE 1.

Referring now in detail to the drawings, a filter unit embodying this invention is identified generally by the reference numeral 11. The filter unit 11 includes a mounting portion or base, indicated generally by the reference numeral 12, and a throw-away type filter cartridge, indicated generally by the reference numeral 13.

The filter cartridge 13 comprises a generally cylindrical sheet metal outer housing 14 closed at one end by an integral end wall 15. The opposite end of the housing 14 is closed by a sheet metal end plate 16 that is sealed and affixed around its periphery to the respective end of the housing 14, as by a rolled over lock seam 17. A rigid backing plate 18 is positioned adjacent the sheet metal end plate 16. The end plate 16 is formed with an integral annular gasket retaining flange 19 in which a circular gasket 21 is positioned to sealingly engage a lower surface 22 of the base 12.

Formed centrally in the backing plate 18 is an inturned neck 23 having a tapped central opening 24 that forms a fluid outlet passage for the filter cartridge 13. A plurality of spaced fluid inlet openings 25 are formed in the backing plate 18 and end plate 16 around the fluid outlet passage 24.

Contained within the throw-away cartridge 13 is an axial flow filter cartridge, indicated generally by the reference numeral 26. The axial flow cartridge 26 is comprised of a substantially imperforate cylindrical outer shell 27 that may be formed from sheet metal or the like. The lower end of the outer shell 27 is closed by an end cap 28 that is affixed around its periphery to the shell 27, as by means of a rolled over joint 29. The upper end of the outer shell 27 is also closed by an end cap 31 that is joined around its periphery to the shell 27 by means of a rolled over joint 32. Either or both of the end caps 28 and 31 may be formed from sheet metal. The end cap 31 is formed with an axially extending neck portion 33 that defines a central opening 34, which may be considered as the outlet passage for the filter cartridge 26. The upper end of the neck portion 33 has an inturned flange 35 that engages a gasket 36 positioned around the periphery of the backing plate neck 32 to form a seal therewith so that the filter cartridge passage 34 will be in sealed communication with the end closure passage 24. A coil spring 37 bears against the outer shell end 15 and a depression 38 formed in the filter cartridge end cap 28 to exert a sealing pressure upon the gasket 36.

Adjacent the end cap 31 and within the central cavity defined by the outer shell 27 and the end caps 28 and 31, a dome shaped sheet metal end cap 39 is position. The dome shaped end cap 39 has an outer flange 40 that engages the outer shell 27 and end cap 31 around its periphery and its domed portion extends away from the end cap 31. A plurality of openings 41 are formed in the end cap 39 for fluid communication between a volume 43 defined between the end caps 31 and 39, which volume is in communication with the fluid outlet passage 34.

The remaining volume of the filter cartridge 26 defines a filtering chamber, indicated generally by the reference numeral 43, in which any suitable filter material such as ram packed cotton or a mixture of cotton or other waste materials is provided. A cloth migration barrier 44 having a plurality of finely spaced openings is positioned across the dome shaped end cap 39 to preclude the passage of small filter material through the openings 41 into system being filtered.

The outer shell 27 is imperforate along the major portion of its length, however, a plurality of fluid inlet openings 45 in the form of circumferentially spaced apertures are provided at the lower end of the outer shell 27. If desired, openings 46 also may be formed in the lower end cap 28 for fluid flow axially through the cartridge 26. The size and number of openings 45 and 46 in addition to the porosity of the media contained within the chamber 43 will determine the amount of flow through the cartridge 26.

The fluid openings 45 and 46 of the filter cartridge 26 act as inlet openings and are in registry with a fluid cavity 48 formed between the outer periphery of the filter cartridge 26 and the inner periphery of the outer shell 13 which cavity is enclosed by the end cap 16. The fluid inlet openings 25 of the backing plate 18 register with this cavity so that fluid flowing into the openings 25 will enter the cavity 48 and flow into the fluid inlet passages 45 and 46 of the filter cartridge 26. The entering fluid passes axially through the media within the filtering chamber 43, through the dome shaped perforate shell 39, into the volume 42 and out the fluid outlet passages 34 and 24.

The base 12 that cooperates with the throw-away filter cartridge 13 is formed with a fluid inlet passage, indicated generally by the reference numeral 51, which terminates at one end in a tapped fitting 52 for attachment to an appropriate component of the line of the fluid being filtered. The other end of the passage 52 opens through the lower surface 22 of the mounting portion 12 and registers with the area confined by the gasket 21. A fluid outlet passage 53 is also formed in the base 12 which passage terminates in a tapped outlet fitting 54 that also may be connected to any suitable component of the system being filtered. The other end of the passage 53 opens into a central bore 55 formed in an outlet fitting, indicated generally by the reference numeral 56. The outlet fitting 56 has an enlarged annular shoulder 57 with a knurled outer surface that may be affixed, as by casting, into the base 12. The lower end of the outlet fitting 56 is formed with a male threaded portion 58 onto which the tapped opening 24 of the backing plate 18 may be threaded to compress the gasket 21 against the mounting portion surface 22. This results in the formation of an annular fluid inlet cavity 59 between the gasket 21 and the base outlet fitting 56.

The disclosed filter assembly may be used as a primary filter in a diesel engine fuel oil system. In such an application, the inlet fitting 52 may be connected to an inlet side of the fuel line so that fuel will flow through the passage 51 into the cavity 59. The oil then flows under pressure through the backing plate inlet openings 25 into the fluid cavity 48 where it will pass into the filter cartridge 26 through the inlet openings 45 and 46. The fuel then will pass axially through the filter media contained within the cavity 43 and from the filter cartridge by means of the outlet opening 34. The filtered fuel will then flow through the passage 55 of the outlet fitting 56 and out of the outlet passage 53. Channelling will be precluded in this filter inasmuch as the pressure of the fuel being filtered creates a piston action upon the media in the cavity 43 compressing it against the dome shaped end cap 39. Thus, any low porosity sections of the media will tend to be evened out by the fluid pressure. The filter preferably acts to remove waxes and other contaminants contained by the oil, which will plate or coat the filter media at the inlet side further increasing the piston action.

The filter cartridge 13 also acts as a coalescing agent to remove water from the fuel, which will flow to a volume 61 formed at the lower end of the filter cartridge 13 between the housing end 15 and the cartridge end cap 28. The water which collects in the volume 61 may be periodically removed by means of a water drain 62 that is fixed centrally within the enclosure 15 and has a central opening closed by a drain plug 63.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A throw-away type axial flow filter comprising an outer housing having a cylindrical portion closed at one end by an integral end wall, end closure means rigidly connected to the other end of said cylindrical portion and forming an end closure for said other end, first fluid passage means formed centrally in said end closure means, said first fluid passage means further providing means for effecting a detachable connection between said filter and a component of a fluid system, a plurality of second fluid passage means formed in said end closure means around said first fluid passage means, a filter cartridge permanently affixed within said outer housing, said filter cartridge comprising an outer shell, a first end cap affixed to one end of said outer shell and forming an end closure therefor, a plurality of fluid openings formed in said outer shell adjacent said first end cap, a second end cap rigidly affixed to the other end of said outer shell and forming an end closure therefor, said second end cap having a neck portion defining a central opening in fluid registry with said first fluid passage means of said end closure means, means for effecting a seal between said neck and said end closure means around said first fluid passage means and radially inwardly of said second fluid passage means for fluid communication of said second fluid passage means with said fluid openings in said outer shell, a perforate dome shaped member affixed within said outer shell adjacent said second end cap and spaced therefrom to define a fluid cavity in registry with said first fluid passage means through said neck, and a filter media contained within said outer shell between said first end cap and said perforate dome shaped member.

2. A throw-away type axial flow filter as set forth in claim 1 further including spring means interposed between the integral end wall of the outer housing and the first end cap of the filter cartridge for urging the neck into sealing engagement with the seal.

3. A throw-away type axial flow filter as set forth in claim 1 further including a plurality of fluid openings in the first end cap.

References Cited
UNITED STATES PATENTS

| 2,110,124 | 3/1938 | FitzGerald | 210—443 X |
| 2,179,784 | 11/1939 | Frudden | 210—131 |
| 2,203,668 | 6/1940 | Burckhalter | 210—131 |
| 2,563,548 | 8/1951 | Plante | 210—444 |
| 2,732,075 | 1/1956 | Bender | 210—443 |
| 2,858,026 | 10/1958 | Lorimer | 210—444 |
| 2,979,208 | 4/1961 | Humbert | 210—232 |
| 2,995,249 | 8/1961 | Boewe et al. | 210—130 |
| 3,272,192 | 9/1966 | Jensen et al. | 210—508 X |

REUBEN FRIEDMAN, *Primary Examiner.*

F. SPEAR, *Assistant Examiner.*